Aug. 31, 1943.   R. E. RISLEY   2,328,031
PIPE CLAMP AND METHOD AND APPARATUS FOR APPLYING SAME
Filed June 17, 1941   7 Sheets-Sheet 1

INVENTOR
Roger E. Risley
BY
Louis Prevost Whitaker
ATTORNEY

Aug. 31, 1943.　　　　R. E. RISLEY　　　　2,328,031
PIPE CLAMP AND METHOD AND APPARATUS FOR APPLYING SAME
Filed June 17, 1941　　　　7 Sheets-Sheet 2

Aug. 31, 1943.  R. E. RISLEY  2,328,031
PIPE CLAMP AND METHOD AND APPARATUS FOR APPLYING SAME
Filed June 17, 1941  7 Sheets-Sheet 3

INVENTOR
Roger E. Risley
BY
Louis Prevost Whitaker
ATTORNEY

Aug. 31, 1943.   R. E. RISLEY   2,328,031
PIPE CLAMP AND METHOD AND APPARATUS FOR APPLYING SAME
Filed June 17, 1941   7 Sheets-Sheet 4

INVENTOR
Roger E. Risley
BY
Louis Trevoot Whitaker
ATTORNEY

Aug. 31, 1943.　　　　R. E. RISLEY　　　　2,328,031
PIPE CLAMP AND METHOD AND APPARATUS FOR APPLYING SAME
Filed June 17, 1941　　　　7 Sheets-Sheet 5

INVENTOR
Roger E. Risley
BY
Louis Alwood Whitaker
ATTORNEY

Aug. 31, 1943.  R. E. RISLEY  2,328,031
PIPE CLAMP AND METHOD AND APPARATUS FOR APPLYING SAME
Filed June 17, 1941  7 Sheets-Sheet 7

INVENTOR
Roger E. Risley
BY
ATTORNEY

Patented Aug. 31, 1943

2,328,031

UNITED STATES PATENT OFFICE 2,328,031

PIPE CLAMP AND METHOD AND APPARATUS FOR APPLYING SAME

Roger E. Risley, Bradford, Pa., assignor to Dresser Manufacturing Company, Bradford, Pa., a corporation of Pennsylvania Application June 17, 1941, Serial No. 398,380

5 Claims. (Cl. 138—97)

My invention consists in the novel features hereinafter described, reference being had to the accompanying drawings which illustrate several embodiments of the invention selected by me for purposes of illustration.

The present invention relates to the repair of underground pipe lines, for example, water mains and to the application of a repair clamp to a pipe line by operations performed above ground through an excavated opening too small to admit a man. In order systematically to clamp the joints of an underground bell and spigot pipe line, it is necessary to dig a hole about every twelve feet along the line. Where the pipe line runs under a paved street, a considerable amount of repaving is required. Moreover, many cities require that the repaving of any hole larger than a specified size, for example one foot square, be done by the city or a city designated contractor, and the cost is often rather high. To avoid this high paving cost and to keep the expense of the excavations at a minimum, it is highly advantageous to install a repair clamp by making only a small hole, for example, one foot square, and apply the clamp to the pipe by operations performed by men above ground, working with special tools through the foot square opening.

The key to success in obtaining a satisfactory repair has been found to be the proper application of the gasket. It has been proposed to attach the gasket to a repair clamp and apply both to the pipe joint simultaneously. However, with this procedure, it is impossible to inspect the gasket after it has been placed on the pipe and before the clamp is applied to insure that the gasket is properly positioned to seal the joint effectively. It is hence difficult to position the gasket properly and be assured of a tight and lasting pipe joint. It is an object of the present invention to overcome this difficulty.

In accordance with the present invention, the gasket is placed on the pipe before the clamp is applied, and the gasket can thus be carefully positioned to seal the joint effectively. The gasket is then secured in position so that it will not be displaced by the application of the pipe clamp. After the gasket is properly positioned and secured in place, the pipe clamp is lowered into the excavation, positioned over the pipe and tightened to apply sealing pressure to the gasket. In this manner the gasket can be inspected before the clamp is applied and a tight repair joint is assured. The invention relates to the novel structure of the clamp and gasket, the method of applying the gasket and clamp to a pipe line and to apparatus for carrying out the method.

The nature and advantages of the invention will be more fully understood from the following description in conjunction with the accompanying drawings which illustrate by way of example a pipe clamp and the installation of the clamp to a pipe.

In the drawings,

Figs. 24, 25, 26 and 27 are schematic vertical sectional views taken transversely of the pipe line and illustrating successive operations in applying the clamp to the pipe joint together with apparatus for carrying out the respective operations.

In Figs. 1 to 4 there is illustrated by way of example a repair clamp embodying the present invention. The clamp comprises a gasket 1, a follower ring 2, an anchor ring 3 and a plurality of through bolts 4, with nuts 5 connecting the follower and anchor ring. The follower ring 2 is composed of a plurality of arcuate sections integrally connected together, the clamp illustrated in the drawings having two such sections 2a and 2b. Each section is shown as having a gasket engaging face 2c and a peripheral portion 2d forming together a V-shaped cross section with a plurality of radial webs 2e connecting the two portions to provide a light, strong construction. At one end of each section, there is provided an apertured hinge portion 2f, 2g, the hinge apertures of the two sections being axially aligned. The hinge portion 2f of section 2a is off-set from the central plane of the ring in a direction away from the gaskets engaging face 2c, and the hinge portion 2g of the section 2b is off-set a greater distance to enable it to come outside of the hinge portion 2f, bringing the two hinge apertures into alignment. One of the through bolts 4 extends through the hinge apertures forming a hinge pin for the two sections of the follower ring. Additional through bolts extend through other apertures 2h provided in the follower ring sections. The free ends of the two sections 2a and 2b are provided with apertured lugs 2i projecting axially from the follower ring in a direction away from the gasket engaging space 2c. The apertures of lugs 2i are preferably threaded to receive a threaded stud bolt 6 connecting the free ends of the two sections together to close the follower ring. Outwardly of the gasket engaging surface, the force exerted by the through bolts in applying pressure to the gasket is out of line with the opposing force exerted by resistance of the gasket and this results in a couple exerting a twisting moment on the sections of the follower ring. Referring for example to the upper half of Fig. 1, it will be seen that the force exerted by the through bolts is toward the right, while the resistance of the gasket is toward the left, thus constituting a couple tending to twist the upper section of the follower ring in a clockwise direction. The offsetting of the lugs 2i in an axial direction gives the connecting bolts 6 greater leverage in resisting this twisting moment, and thus puts less strain on the bolts. Moreover, the axially offset lugs make it possible to position the bolt 6 closely adjacent the wall of the pipe in approximately the same plane as the forces acting on the follower ring, so that the bolt is in tension rather than being subjected to bending or torsion. Resistance to the twisting moment on the ring section is supplemented by the offsetting of the hinge portions 2f and 2g as described above.

Figure 1:
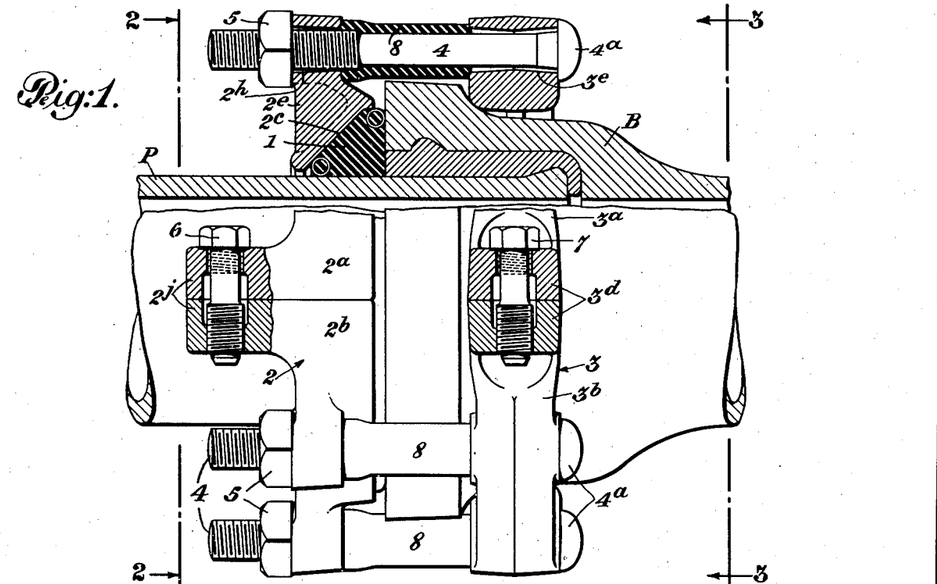
Fig. 1 is a side elevation partially in section of a bell and spigot pipe joint with a repair clamp in accordance with the invention applied thereto.
Figure 2:
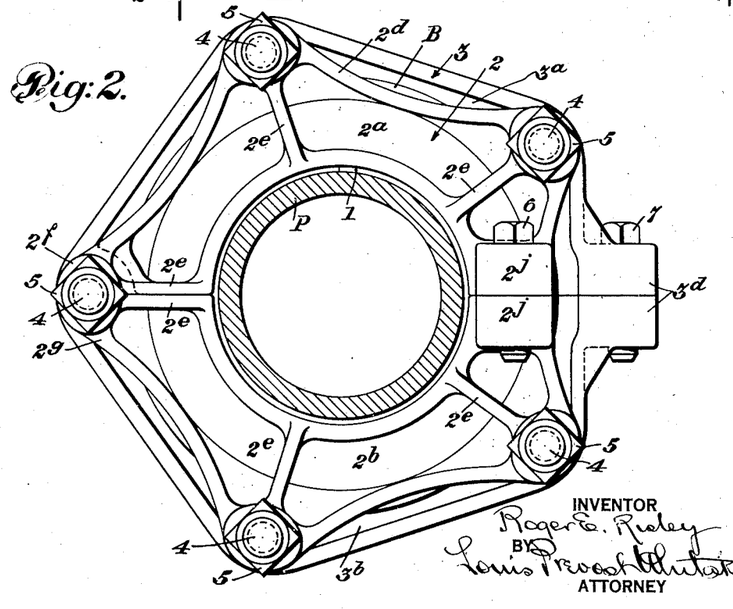
Fig. 2 is a vertical sectional view taken on the line 2—2 in Fig. 1.
Figure 3:
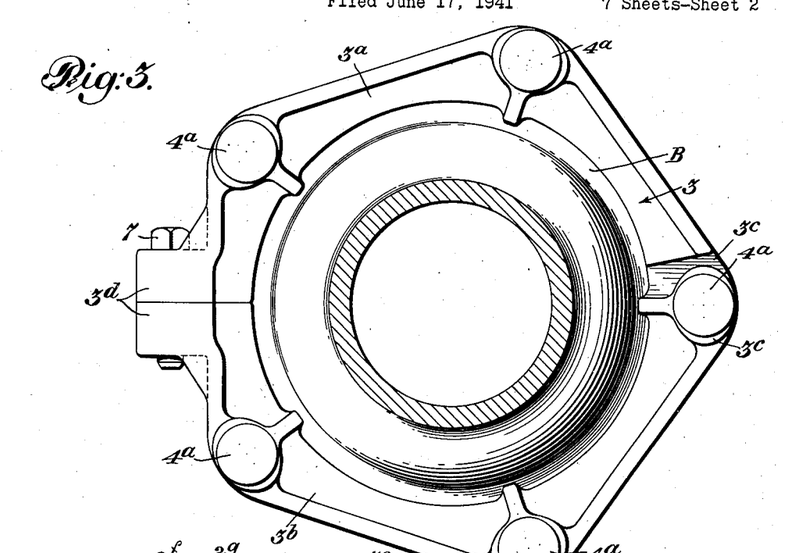
Fig. 3 is a sectional view taken on the line 3—3 in Fig. 1.
Figure 4:
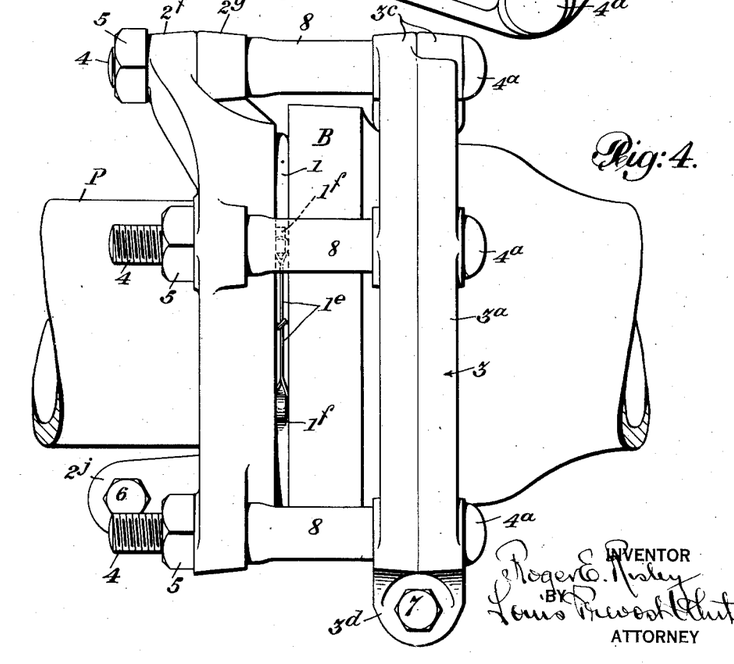
Fig. 4 is a top plan view of the pipe joint and clamp shown in Fig. 1.
Figure 5:
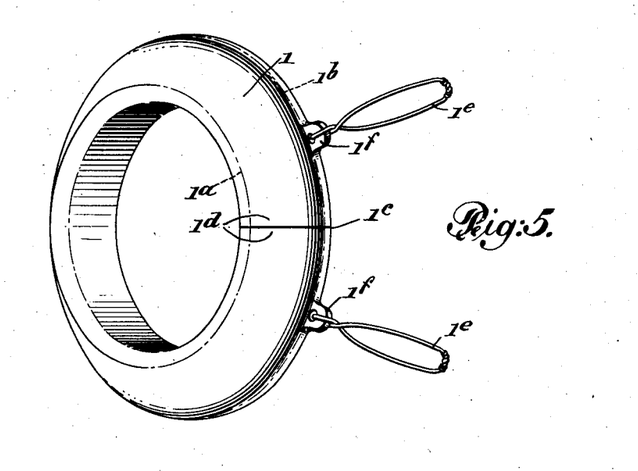
Fig. 5 is a perspective view of the gasket of the pipe clamp shown in Fig. 1.
Figures 6, 7, 8:
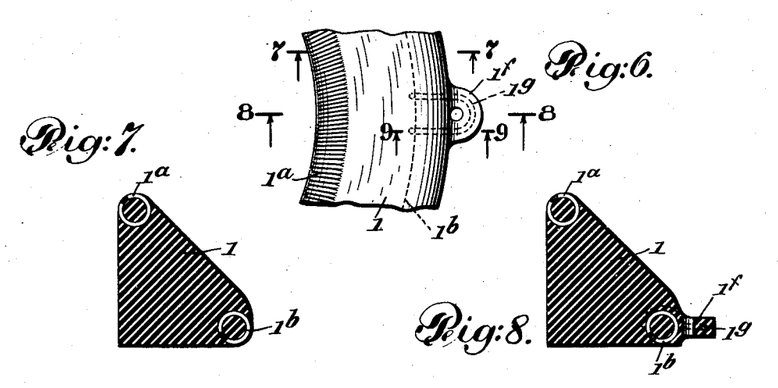
Fig. 6 is a fragmentary end elevational view of the gasket showing the construction of one of the eyelets for fastening the ends of the gasket together.
Fig. 7 is a sectional view taken on the line 7—7 in Fig. 6.
Fig. 8 is a sectional view taken on the line 8—8 in Fig. 6.

The anchor ring 3 is adapted to fit over the bell of the pipe and is likewise made up of a plurality of hinged sections, being illustrated as having two sections 3a and 3b. In the embodiment shown in the drawings, the two sections of the anchor ring are identical and can hence be made with the same pattern or dies. Each section has an apertured hinge portion 3c, the apertures being axially aligned to receive a through bolt 4 which forms a hinge pin connecting the two sections. The free ends of the sections are provided with lugs 3d having apertures which are preferably threaded to receive a bolt 7 connecting the ends of the two sections together. The lugs 3d may be offset axially as described above for the anchor ring, but this is generally unnecessary as the distance between the opposing forces and hence the twisting moment on the anchor ring is less. It is hence preferable for the lugs to be radially disposed in order to restrict the axial dimensions of the anchor ring so that it may readily be used on T's, L's or other fittings. In addition to the hinge apertures, the anchor ring is provided with apertures for the other through bolts, all of the apertures being preferably non-circular to receive track head through bolts and prevent them from turning. The relatively heavy through bolts 4 extending through the hinge apertures provide a strong hinge construction which permanently connects the ring section into a single assembly, and enables both ring sections to be secured about the pipe by only two connecting bolts 6 and 7. The hinged sections of the two rings are held in alignment by an impervious endwise compressible sleeve 8, which is formed, for example, of rubber or similar resilient deformable material, and extends from the anchor ring to the follower ring. Referring particularly to Fig. 4 it will be seen that in conjunction with the heads 4a and nut 5 of the through bolt, the rubber sleeve 8 holds the section of each ring in alignment and prevents axial separation of the coacting hinge portions. The sleeve also holds the track head 4a of the bolt in engagement with the non-circular aperture of the anchor ring to hold the bolt against rotation. The length of the sleeve 8 is such that when the through bolts are tightened, the sleeve is compressed so that the ends of the sleeve are pressed tightly against the anchor ring and follower ring respectively, thereby sealing the ends of the sleeve and completely enclosing the portion of the bolt extending between the two rings. This critical portion of the through bolt is thus effectively protected against corrosion by the soil. The other through bolts are preferably likewise enclosed by rubber sleeves 8 which protect the bolts against corrosion, hold the track heads of the bolt in engagement with the non-circular openings of the anchor ring and maintain the anchor ring and follower ring in properly spaced relationship. By referring particularly to Fig. 1 it will be seen that in placing the clamps around the pipe joints the rubber sleeves 8 engage the periphery of the bell of the pipe and thereby assist in centering the clamp on the pipe joint.

Figure 9:
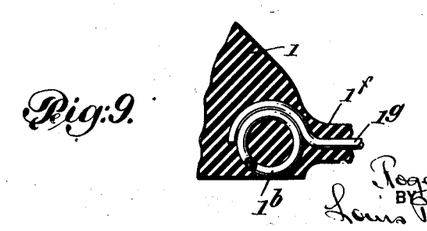
Fig. 9 is an enlarged fragmentary sectional view taken on the line 9—9 in Fig. 6.
Figure 22:
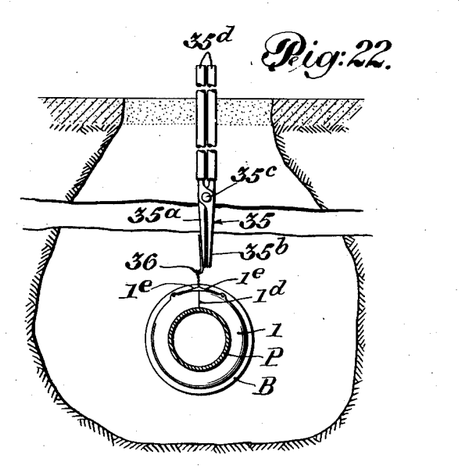

The gasket 1 shown in more detail in Figs. 5 to 9 is preferably formed of rubber or similar resilient deformable material. In the form shown, the gasket is of approximately triangular cross section and preferably has its outer corners protected by coiled wire reinforcing elements 1a and 1b to restrain undesirable cold flow of the rubber. The rubber ring is split as indicated at 1c so that the two ends 1d of the open ring may be separated in order to place the gasket over a pipe. Means is provided for securing the two ends of the split ring together to hold the gasket in position on the pipe on which it has been placed. In the embodiment illustrated, the means for connecting the end of the ring comprise loops of wire 9 passing through eyelets 1f provided adjacent the ends of the ring. Each eyelet 1f may be reinforced by a wire staple 1g which is preferably anchored to the reinforcing element 1b as illustrated in Fig. 9. The wire loops and eyelets are preferably spaced back away from the end faces of the ring in order to leave the ends of the ring free so that the gaskets may be forced over the pipes in the manner illustrated in Fig. 20, without damaging or interfering with the loops and eyelets. The ends of the gasket ring may be drawn together and united by twisting the two loops of wire together as illustrated in Fig. 22. It will be seen that the connecting means for the ends of the gasket in no way interfere with the engagement of the gasket with the follower ring and with the adjacent pipe surfaces.

Figure 14:
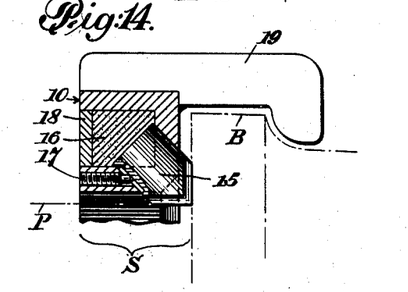
Fig. 14 is a sectional view taken on the line 14—14 in Fig. 12.

The method of applying the gasket and clamp to a pipe line will now be described in conjunction with apparatus for carrying out the method. After an excavation has been made from a small hole in the paving down to the pipe line, the pipe joint is cleaned by apparatus illustrated in Figs. 10 to 15. The cleaning apparatus shown in these figures comprises an annular carrier 10 composed of a plurality of arcuate sections 10a and 10b which are hingedly connected together by pins 11. Means is provided for connecting the free ends of the sections together to close the carrier about a pipe. In the embodiment illustrated, the connecting means comprise a bolt 12, threaded into a nut pivotally carried by a bifurcated lug 10c on one section, and adapted to swing so that the head of the bolt can be brought into engagement with a bifurcated lug 10d on the other section, whereupon the two sections can be drawn closely together by tightening the bolt. The sectional carrier ring carries a plurality of cleaning elements for cleaning both peripheral and radial surfaces of a pipe joint. As illustrated in the drawings which show apparatus particularly adapted to clean a bell and spigot joint, the cleaning elements comprise staggered rows of scrapers or pins 13, projecting axially from an end face of the carrier 10 and adapted to engage and clean the end face of the bell. Staggered rows of similar pins or scrapers 14 project inwardly from the carrier and are adapted to clean the adjacent peripheral surface of the spigot. Other scrapers 15 projecting at an angle from a corner of the carrier are positioned to clean the corner formed by the bell and spigot. In the embodiment illustrated, the carrier is of channel cross section and the pins 13, 14 and 15 are held in place by being inserted from the inside of the channel, whereupon the channel is filled with cementitious material 16. The corner scrapers 15 may be further held in place by set screws 17 (Fig. 14). The cementitious material 16 may be enclosed by an annular cover plate 18. The carrier is also preferably provided with scraper blades 19 shaped as shown in Fig. 14 to clean the scarf of the bell. These blades may be welded or otherwise secured to the carrier. The various cleaning elements carried by the carrier 10 are actuated by rotating the carrier about the pipe. In the form illustrated in Figs. 10, 11 and 12, the means for imparting rotary motion to the carrier comprises an operating handle 20 pivotally connected to the carrier as indicated at 20a. It will be seen that the carrier may be readily oscillated by reciprocatory movements of the handle.

Figure 10:
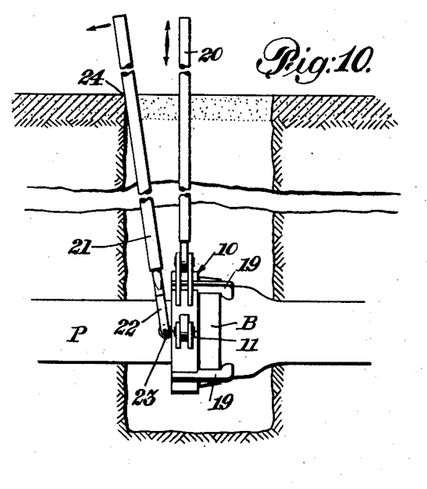
Fig. 10 is a schematic vertical sectional view showing apparatus for cleaning the pipe joint.
Figures 11, 12, 15:
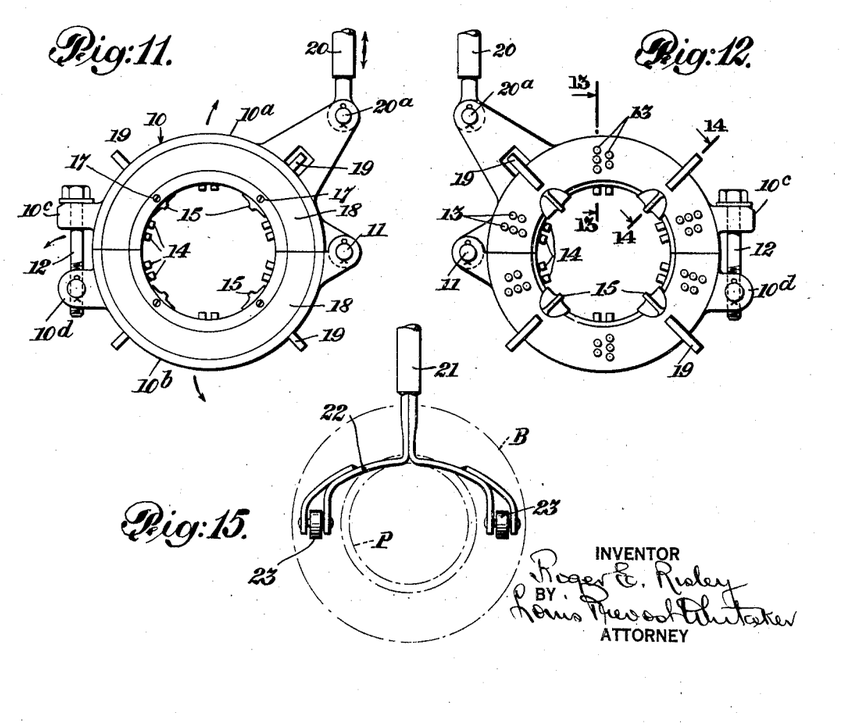
Fig. 11 is an enlarged end elevation of the cleaning apparatus taken from the left of Fig. 10.
Fig. 12 is an end elevation of the cleaning apparatus taken from the right of Fig. 10.
Fig. 15 is a detailed view of the pressure bar shown in Fig. 10.
Figure 13:
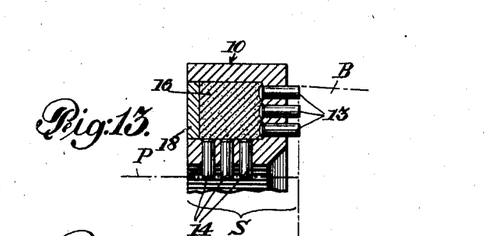
Fig. 13 is a sectional view taken on the line 13—13 in Fig. 12.

In order to clean the end face of the bell, or other radially projecting surface of a pipe joint satisfactorily, it is necessary to provide means for applying pressure to the carrier 10 in a direction axially of the pipe in order to press the cleaning elements into engagement with the radially projecting surface of the pipe joint. As illustrated in Figs. 10 and 15, the pressure applying means comprises a pressure bar 21 having at its lower end a fork 22, adapted to straddle the pipe, indicated by the broken line P, and carrying at opposite ends of the fork rollers 23 or other anti-friction means adapted to engage the carrier 10. The cover plate 18 of the carrier provides a smooth annular raceway for engagement by the rollers 23 of the pressure bar. By rocking the pressure bar about a suitable fulcrum, for example, the edge of the hole, as indicated at 24 in Fig. 10, the rollers 23 can be pressed against the carrier to force the scrapers 13 and 15 into firm engagement with the end face of the bell. Thus by oscillating the carrier and simultaneously applying pressure to to the carrier in a direction axially of the pipe, all surfaces of the pipe joint to be engaged by the clamp can be effectively cleaned.

Figure 16:
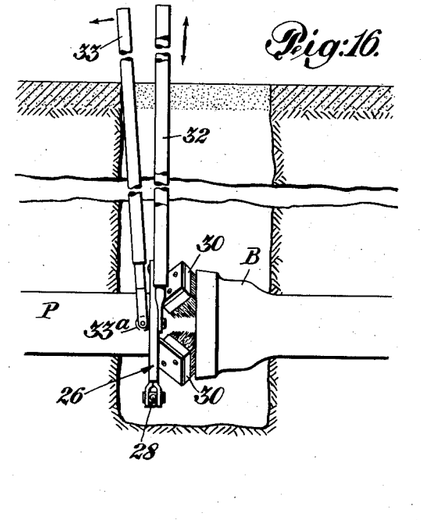
Fig. 16 is a schematic vertical sectional view showing another form of cleaning apparatus.
Figure 17:
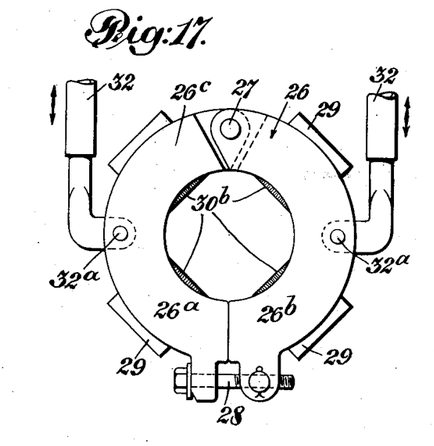
Fig. 17 is an end elevation of the cleaning apparatus taken from the left in Fig. 16.
Figure 18:
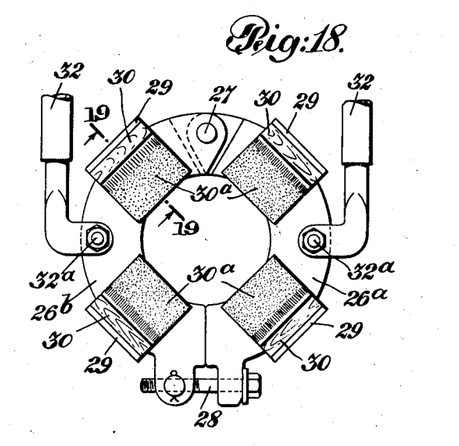
Fig. 18 is an end elevation of the cleaning apparatus taken from the right of Fig. 16.
Figure 19:
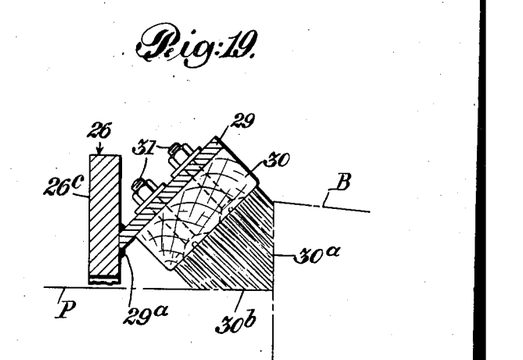
Fig. 19 is an enlarged sectional view taken on the line 19—19 in Fig. 18.

After the pipe joint has been scraped with the apparatus shown in Figs. 10 to 15, the surfaces to be engaged by the gasket may be further cleaned by means of the apparatus shown in Figs. 16 to 18. This apparatus comprises an annular carrier 26 composed of a plurality of sections 26a and 26b hinged together by a hinge pin 27, and having means for connecting the free ends of the carrier sections, for example, a swivel bolt 28, similar to the bolt 12 of Figs. 11 and 12. On one end face of the carrier there are provided a plurality of wings 29 which may be welded to the carrier as indicated at 29a, and project at an angle of approximately 45° to the axis of the carrier. One or more steel brushes 30 are secured to each of the wings 29 by any suitable means as for example, bolts 31. The bristles of each brush are preferably trimmed to provide the brush with two work-engaging faces 30a and 30b forming an angle of approximately 90° with one another, as indicated in Fig. 19. It will be seen that this V-shaped brush fits into the corner between the end face of the bell, indicated at B and the adjacent peripheral surface of the spigot indicated at S, and provides a smooth clean seat for the gasket 1. The brushes 30 are actuated by oscillating the carrier 26 about the pipe by means of one or more elongated handles 32 pivotally connected to the carrier at 32a. During oscillation of the carrier, the brushes 30 may be pressed into firm engagement with the end face of the bell or other radially projecting surface of a pipe joint by applying pressure to the carrier in an axial direction, for example by means of a pressure bar 33 which may be the same as the pressure bar 21 shown in Figs. 10 and 15. For this purpose the carrier is provided with a smooth face 26c (Fig. 19) forming an annular raceway for engagement by rollers 33a of the pressure bar.

Figure 20:
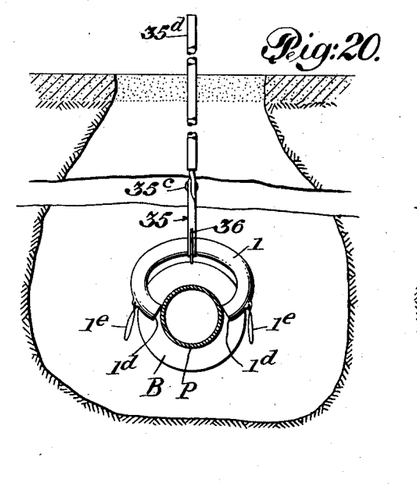
Figs. 20, 21 and 22 are vertical sectional views taken transversely of the pipe line and illustrating successive operations in applying the gasket and securing it in position.
Figure 21:
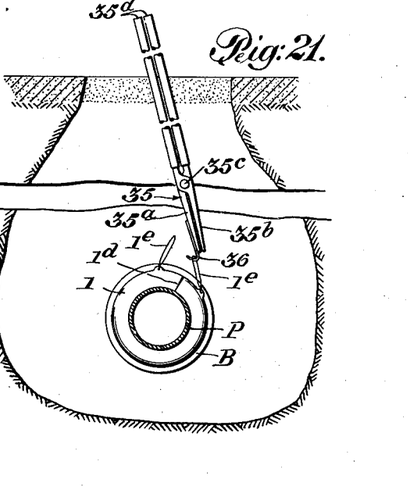
Figure 23:
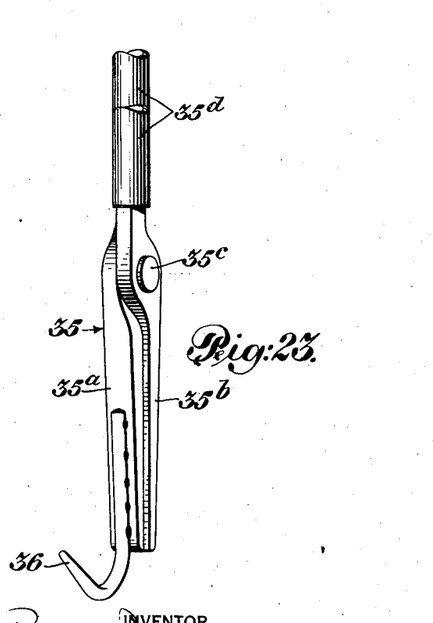
Fig. 23 is an enlarged fragmentary view of the tool shown in Figs. 20 to 22.

After the pipe joint has been thoroughly cleaned, the gasket 1 is placed around the pipe and secured in proper position to seal the joint. Successive operations in applying the gasket are illustrated in Figs. 20 to 22. Apparatus for performing these operations is shown in more detail in Fig. 23. This apparatus comprises tongs 35 having opposed jaws 35a and 35b pivotally connected at 35c and elongated operating handles 35d for opening and closing the jaws. One of the jaws 35a is provided adjacent its end with an outwardly and backwardly projecting hook 36 which may be permanently secured to the jaw, for example, by welding. As illustrated in Fig. 20, the gasket may be placed on the pipe by gripping the gasket with tongs 35 at a point opposite the ends 1d of the split ring and pressing the ends down over the pipe. As the wire loops e are spaced back a short distance from the ends of the gasket ring, this operation does not interfere with or damage the loops. One of the wire loops 1e is then grappled with the hook 36, and the gasket is rotated about the pipe (Fig. 21) to a position in which the split of the gasket ring is approximately at the top of the pipe. The other wire loop 1e is then grappled so that both loops are in the hook 36, and the hook is thereupon rotated to twist the wire loops together. This operation draws the ends of the gasket toward one another and secures them in abutting relationship. The gasket is now held securely on the pipe and may be inspected to assure that it is in proper position before the clamp is applied.

After the gasket has been carefully positioned and secured in place on the pipe, the repair clamp is installed by the operations illustrated in Figs. 24 to 27. It will be understood that before being placed on the pipe, all parts of the pipe clamp are assembled together, the assembling having preferably been done at the factory. The anchor ring and the follower ring are connected together by the through bolt 4 and the arcuate sections of each ring are hingedly connected by one of the through bolts. The connecting stud bolts 6 and 7 for the follower ring and anchor ring are screwed into the threaded apertures of the lugs 2h and 3d of the upper sections of the respective rings. The ring in this pre-assembled condition is lowered into the excavation by means of a suitable hook 38 which is hooked under one of the through bolts of the upper ring sections so that the ring hangs open as shown in Fig. 24. The upper ring sections are placed over the top of the pipe with the anchor ring behind the scarf of the bell, and the follower ring on the opposite side of the gasket. The clamp is then closed by grappling one of the through bolts of the lower ring sections with the hooks 38 and raising the lower sections of the rings as shown in Fig. 25. The excavation may be belled out laterally as shown to afford adequate room for installing the clamp. While holding the lower ring section up by means of the hook 38, the connecting bolts 6 and 7 are screwed into the apertured lugs of the lower ring sections and tightened by means of a long handled socket wrench illustrated in Fig. 25.

With the free ends of the hinged ring sections thus connected together to secure the clamp about the pipe, the nuts 5 on through bolts 4 are next drawn up to apply sealing pressure to the gasket. Initial tightening of the nuts is speedily effected by the geared wrench illustrated in Fig. 26. This wrench designated in general by the reference numeral 41 comprises a frame or housing 42 which is shown in the form of a double yoke. A spindle 43 is rotatably mounted in the housing and carried at one or each end of a wrench head or socket 44. The spindle 44 is rotatable by means of a gear 45, which meshes with a gear 46 carried by an operating shaft 47, rotatably mounted in the housing with its axis at right angles to the axis of the spindle. The operating shaft 47 extends upwardly and has at its upper end an operating handle 48 whereby the shaft may be rotated in either direction. The gears connecting the operating shaft 47 with the spindle 43 may be selected to drive the spindle at the desired speed. To prevent rotation of the housing 42 by the torque applied to the operating shaft 47, a reaction shaft 49 is secured at one end to the housing and extends parallel with and adjacent to the operating shaft. In the embodiment shown in Fig. 26 the reaction shaft and operating shaft are arranged coaxially with one another. The reaction shaft 49 may be provided with a suitable handle 50. The wrench is operated by placing the wrench head over the nut of the through bolt of the clamp and rotating the spindle 43 and wrench head 44 by rotation of the operating shaft 47, while maintaining the wrench in place and preventing rotation of the housing by holding the reaction shaft 49 stationary. With this apparatus the nuts of the through bolts can be rapidly drawn up.

Final tightening of the nuts on the through bolts of the clamp is effected by the ratchet wrench 52 illustrated in Fig. 27. This wrench comprises an arm 53 pivotally connected at 54 to an elongated handle 55, and carrying at the outer end of the arm a ratchet socket 56. A spring connection between the arm 53 and handle 55 holds the arm in laterally projecting position to facilitate placing the socket 56 over the nut while permitting relative pivotal movement between the arm and the handle during operation of the wrench. The wrench is operated by lengthwise reciprocation of the handle 55, whereby the arm 53 is oscillated about the through bolts of the clamp. By reason of the ratchet socket, oscillation of the arm in one direction tightens the nuts, while oscillation in the opposite direction constitutes an idling stroke. The leverage provided by the arm 53 makes it possible to draw the nuts up tightly to apply effective sealing pressure to the gasket of the clamp.

It will be understood that by means of the apparatus described above, all the operations in preparing the pipe and installing the gasket and the clamp can be performed by men working above the surface of the ground, it being unnecessary for anyone to descend into the excavation. The repair clamp can hence be installed by operations performed wholly through an opening too small to admit a man, thereby effecting a substantial saving in excavating and repaving costs.

Having thus described my invention, what I claim and desire to secure by Letters Patent is:

1. A method of applying a repair clamp to an underground pipe line by operations performed through an opening too small to admit a man, comprising the steps of applying a gasket in proper position on the pipe securing said gasket against displacement, thereafter positioning a sectional repair clamp over the gasket, securing the sections together and tightening the clamp to apply sealing pressure to the gasket.

2. A method of applying a repair clamp to an inaccessible pipe line by opertions performed through an opening too small to admit a man, comprising the steps of cleaning the surface of the pipe, applying a split gasket to the cleaned surface, securing the ends of the gasket together to hold the gasket firmly in proper position on the pipe, thereafter positioning over the gasket a hinged clamp having spaced sectional rings connected by through bolts, securing the sections of each ring together and tightening the through bolts to apply sealing pressure to the gasket.

3. A method of applying a repair clamp gasket to a pipe by operations performed through an opening too small to admit a man, said gasket comprising a split ring of resilient deformable material with a wire loop provided adjacent each end of said ring, comprising the steps of placing the gasket around the pipe, engaging both of said wire loops with a suitable instrument and rotating said instrument to twist the loops together thereby drawing the ends of the gasket toward one another and securing the gasket in position on the pipe with its ends held in abutting relationship.

4. A method of applying a repair clamp gasket to a pipe by operations performed through an opening too small to admit a man, said gasket comprising a split ring of resilient deformable material having a wire loop provided at a point spaced from each end of said ring, comprising the steps of gripping the gasket at a point opposite the ends of the split ring and forcing said ends over the pipe, grappling both of said wire loops with a suitable hook and rotating said hook to twist the loops together, thereby drawing the ends of the gasket toward one another and securing them in abutting relationship.

5. A method of applying a repair clamp to a pipe joint comprising the steps of providing a split gasket with securing means having portions permanently secured to the gasket on opposite sides of the split, placing the gasket about the pipe and positioning it to seal said joint, securing the ends of the gasket together with said securing means to hold the gasket firmly in proper position, thereafter positioning a sectional repair clamp over the gasket, securing the sections together and tightening the clamp to apply sealing pressure to the gasket.

ROGER E. RISLEY.